US012242870B1

(12) United States Patent
Murphy et al.

(10) Patent No.: US 12,242,870 B1
(45) Date of Patent: Mar. 4, 2025

(54) SHORTENING SERVICE INTERRUPTIONS

(71) Applicant: Amazon Technologies, Inc., Seattle, WA (US)

(72) Inventors: Bryan Murphy, Seattle, WA (US); David Cliffe, Bellevue, WA (US); Dan Ledrick, Redmond, WA (US); Oren Nachman, St. Ives (AU); Yevgeny Schreiber, Baulkham Hills (AU); Abhineet Bansal, Sydney (AU); David Vadas, Redfern (AU); Arvind Namasivayam, Sydney (AU); Donavan Miller, Darlington (AU)

(73) Assignee: Amazon Technologies, Inc., Seattle, WA (US)

(*) Notice: Subject to any disclaimer, the term of this patent is extended or adjusted under 35 U.S.C. 154(b) by 217 days.

(21) Appl. No.: 16/836,044

(22) Filed: Mar. 31, 2020

(51) Int. Cl.
*H04L 41/06* (2022.01)
*G06F 3/0482* (2013.01)
*G06F 3/04847* (2022.01)
*G06F 9/451* (2018.01)
*G06F 11/32* (2006.01)
*H04L 43/0811* (2022.01)
*H04L 43/0876* (2022.01)
*H04L 51/046* (2022.01)

(52) U.S. Cl.
CPC ............ *G06F 9/453* (2018.02); *G06F 3/0482* (2013.01); *G06F 3/04847* (2013.01); *G06F 11/323* (2013.01); *H04L 41/06* (2013.01); *H04L 43/0811* (2013.01); *H04L 43/0876* (2013.01); *H04L 51/046* (2013.01)

(58) Field of Classification Search
CPC .... G06F 9/453; G06F 3/04847; G06F 3/0482; G06F 11/323; H04L 41/06; H04L 43/0876; H04L 43/0811; H04L 51/046
See application file for complete search history.

(56) References Cited

U.S. PATENT DOCUMENTS

| | | | |
|---|---|---|---|
| 2005/0047579 A1* | 3/2005 | Salame ............... | H04L 65/4007 379/265.09 |
| 2012/0143616 A1* | 6/2012 | Pulak .................. | G06Q 10/087 705/1.1 |
| 2012/0158543 A1* | 6/2012 | Buch .................... | G06Q 50/12 705/26.61 |
| 2015/0120903 A1* | 4/2015 | Zakharov ........... | H04L 41/5016 709/224 |

(Continued)

*Primary Examiner* — Haoshian Shih
(74) *Attorney, Agent, or Firm* — Lee & Hayes, P.C.

(57) ABSTRACT

Technologies are disclosed for shortening and/or minimizing service interruptions. An incident service executing within a service provider network is used to detect an incident that has caused a service interruption and performs operations to assist in resolving the service interruption. The incident service may identify resources (e.g., computing resources, individuals, . . . ) to triage and remediate the service interruption. For instance, the incident service may provide information to one or more users of a customer experiencing a service interruption to assist in guiding the user(s) to address one or more problems to assist in resolving the service interruption. The information may include information such as providing one or more recommendations to configure one or more services, such as one or more actions to perform (e.g., a step-by-step runbook).

20 Claims, 12 Drawing Sheets

(56) References Cited

U.S. PATENT DOCUMENTS

| | | | | |
|---|---|---|---|---|
| 2015/0347683 A1* | 12/2015 | Ansari | ............... | H04L 9/30 |
| | | | | 726/7 |
| 2016/0044069 A1* | 2/2016 | Thomas | ............ | H04L 51/34 |
| | | | | 709/228 |
| 2017/0093874 A1* | 3/2017 | Uthe | ............... | G06F 3/0482 |
| 2017/0366983 A1* | 12/2017 | Gunasekara | ........ | H04L 43/0811 |
| 2019/0260879 A1* | 8/2019 | Raleigh | ............ | H04W 4/24 |

* cited by examiner

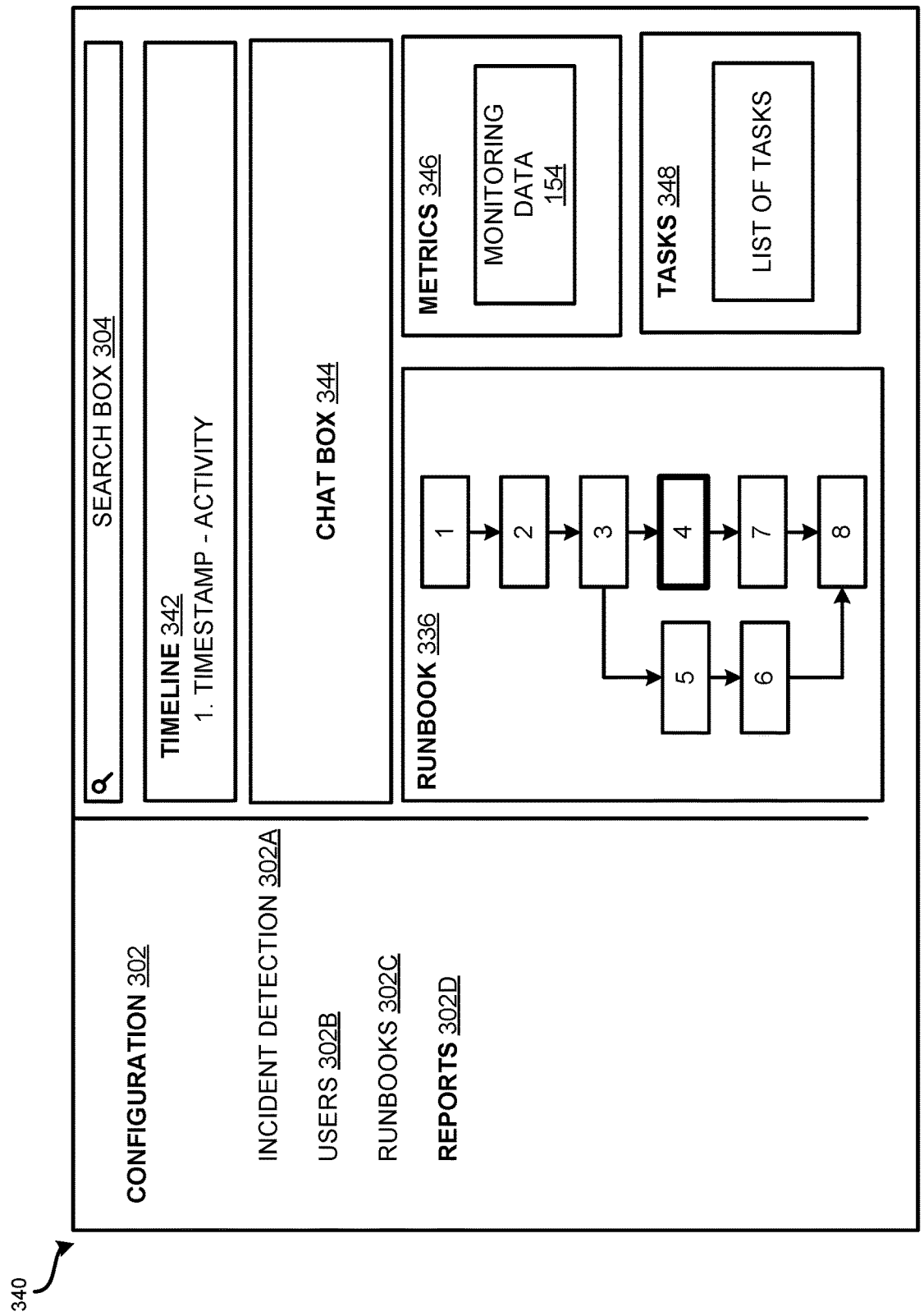

SHORTENING SERVICE INTERRUPTIONS

BACKGROUND

An entity looking to innovate quickly may struggle to adopt policies and practices that shorten the development life cycle while still providing high-quality software. In some instances, an entity may place software into a service that may experience a higher frequency of business-impacting service interruptions compared to other software that was developed according to different guidelines. These service interruptions, however, can be costly for the entity. Not only may service interruptions impact revenue, the service interruptions may negatively impact customer trust. For example, during a service interruption, a customer of the entity may not be able to access and utilize functionality provided by the entity. The longer the duration of a service interruption, the more impact the service interruption may have on the customers and the entity. It can be difficult, however, to detect the occurrence of a service interruption and once detected, it may be difficult for the entity to resolve the service interruption.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3D is a block diagram showing an illustrative graphical user interface that may be utilized to configure data to display to respond to a detected service interruption.

DETAILED DESCRIPTION

Figure 1:
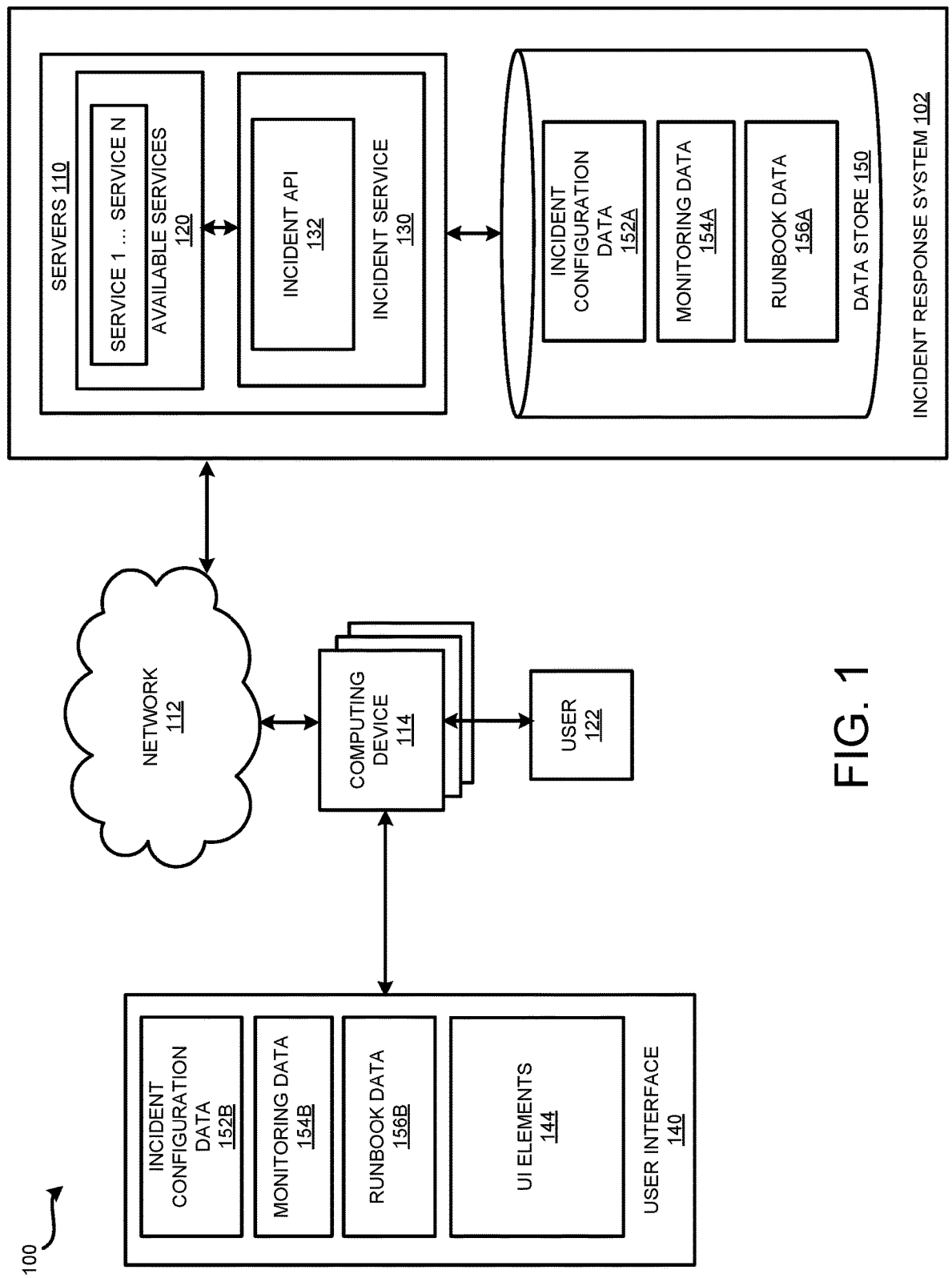
FIG. 1 is a software and network architecture diagram showing aspects of the configuration and utilization of an incident response system for shortening service interruptions.

The following detailed description is directed to technologies for shortening service interruptions. As used herein, a "service interruption" is a period of time in which functionality associated with an application, a site, a service, or some other component is limited and/or is indicated to become limited (e.g., the functionality is unavailable, slow to respond, . . . ). Utilizing technologies described herein, an incident response system is configured to detect incidents associated with a service interruption that impacts and/or may impact customers of a service provider network and provides information, tools, and/or other functionality to allow users of an entity to troubleshoot and mitigate the service interruption.

In some configurations, an incident service executing within a service provider network is used to detect incident(s) that may indicate a service interruption associated with a customer of the service provider network and perform operations to assist in resolving the service interruption. These incidents may involve loss of network connectivity to an application provided by a customer and hosted by the service provider, failure of computing resources utilized by the application, slower response times, and the like. According to some examples, the incident service may identify resources (e.g., computing resources, individuals, . . . ) to triage and remediate the service interruption. For instance, the incident service may provide information to one or more users of a customer experiencing a service interruption to assist in guiding the user(s) to address one or more problems to assist in resolving the service interruption. The information may include one or more actions/tasks to be performed (e.g., re-start a service, configure one or more services, perform some other task(s), . . . ).

In some configurations, the incident service may identify actions to perform and provide one or more runbooks that may include manual tasks and/or automated tasks to assist in resolving the service interruption. Some/all of the actions may be generated by the service provider network based on previous actions performed (by one or more users), and/or from actions determined from other sources (e.g., one or more users). As used herein, a "runbook" identifies one or more predefined procedures and/or actions that are directed at achieving a specific outcome. Generally, a runbook identifies the information to successfully perform a procedure. The runbook may include instructions for the customer to manually perform and/or instructions that are automatically executed.

In some configurations, the incident service may detect an incident associated with a service interruption in response to a triggering event. As used herein, a "triggering event" is an occurrence of one or more specified events/alarms. For example, a triggering event may be identified from an occurrence of one or more conditions within the service provider network (e.g., loss of network connectivity that prevents one or more customers of the entity to access one or more services provided by the service provider network). An alarm may be associated with one or more conditions (e.g., bandwidth, bandwidth and memory, memory, memory plus one or more other conditions, and the like).

When a triggering event is detected that indicates the occurrence of an incident that has customer impact, the incident service may identify and send a message to individuals that are assigned to resolve the service interruption. According to some configurations, after identifying a service interruption, the incident service identifies the individuals associated with the customer to resolve the service interruption in a timely manner. For instance, the incident service may identify one or more subject matter experts to address a particular incident instead of first notifying a user that does not have the knowledge to address the particular incident causing the service interruption.

The incident service may also obtain relevant information from one or more services provided by the service provide network to present to one or more users of the customer experiencing the service interruption. For instance, the incident service may provide a user interface (UI), such as a graphical UI (GUI), that displays information relating to the service interruption in response to an individual assigned to resolve the service interruption selecting an option to display the UI. The UI may be utilized by identified individuals of the customer to perform steps indicated by one or more runbooks, customize a runbook, display information for various metrics (e.g., network connectivity, throughput, processor utilization, memory utilization, storage information, . . . ). In some examples, the UI may also utilize one or more services/components provided by a third party that is not part of the service provider network.

Utilizing the techniques described herein, the incident response system may assist an entity to reduce costs associated with service interruptions by shortening the duration of service interruptions. The incident service may quickly identify incidents associated with service interruptions and provide information to individuals identified to address the incident to resolve the incident in a timely and efficient manner. By resolving service interruptions quickly, computing resources are more efficiently utilized by the service provider network. Additional details regarding the various components and processes described briefly above for shortening service interruptions will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization an incident response system 102 for preventing, shortening, and/or minimizing service interruptions. It is to be appreciated that the environment 100 is merely illustrative and that the various configurations disclosed herein can be utilized in many different types of computing environments.

To provide the incident service 130 and the other functionality disclosed herein, the incident response system 102 may include one or more servers 110. The servers 110 can execute software components to provide the services described herein, including incident service 130 functionality and different available services 120 provided by a service provider and/or some other entity. The software components can execute on a single server 110 or in parallel across multiple servers in the incident response system 102. In addition, a software component can consist of subcomponents executing on different servers 110 or other computing devices in the incident response system 102. Various components can be implemented as software, hardware, or any combination of the two. In this regard, it is to be appreciated that the incident response system 102 shown in FIG. 1 has been simplified for discussion purposes and that many additional software and hardware components can be utilized.

A user 122 of the incident response system 102 can utilize the incident service 130, via a computing device 114 or some other input device, to access the incident response system 102 through a network 112. According to some configurations, the computing device 114 may be configured to understand natural language voice commands and complete tasks for the user, such as tasks related to replication as described herein. As illustrated, a user may interact with the incident service 130 through a user interface 140. In some examples, the user 122 is a customer of a service provider network.

The computing device 114 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, a telephone, a telephone conferencing device, video conferencing device, or any other type of computing device capable of connecting to the network 112 and communicating with the incident response system 102. In other configurations, the computing device 114 may be configured to communicate with one or more other devices to receive commands from users and/or perform processing related to functionality of the incident response system 102.

As illustrated, the computing device 114, or some other device or component, may couple with an incident response system 102 over a network 112. The network 112 may represent an array or wired networks, wireless networks (e.g., Wi-Fi), or combinations thereof. The incident response system 102 may generally refer to a network-accessible platform implemented as a computing infrastructure of processors, storage, software, data access, and so forth that is maintained and accessible via the network 112, such as the Internet. These services may not require end-user knowledge of the physical location and configuration of the system that delivers the services. Common expressions associated with these remote services, such as the incident response system 102, include "on-demand computing", "software as a service (SaaS)", "platform computing", "network accessible platform", and so forth.

As illustrated, the incident response system 102 may comprise one or more network-accessible resources, such as servers 110. These resources comprise one or more processors and computer-readable storage media executable on the processors. In some configurations, the users 122 may be identified and/or authenticated before interacting with the computing device 114 that is associated with the incident response system 102.

The network 112 can be a local-area network ("LAN"), a wide-area network ("WAN"), the Internet, or any other networking topology known in the art that connects the user devices to the incident response system 102. The user 122 can use an application (not shown) executing on computing device 114 that provides user interface 140 to access and utilize the incident service functionality provided by the servers 110. In some examples, the application is a web browser application (not shown). Generally, a web browser application exchanges data with the servers 110 in the incident response system 102 using the hypertext transfer protocol ("HTTP") over the network 112. The application might also be a stand-alone client application configured for communicating with the servers 110.

The application can also utilize any number of communication methods known in the art to communicate with the incident response system 102 and/or the servers 110 across the network 112, including remote procedure calls, SOAP-based web services, remote file access, proprietary client-server architectures, and the like. According to some configurations, the application may provide a user interface 140 that can be utilized by the user 122 to configure settings associated with the incident service 130 and/or the computing device 114. Typically, a user 122 interacts with the computing device 114 using user interface 140.

As discussed above, an incident service 130 is configured to shorten and/or minimize service interruptions that impact access to customer functionality hosted by the service provider network. In some examples, a user, such as user 122, may utilize the incident response system 102 to receive information and perform actions relating to addressing a service interruption. According to some configurations, the user 122 may view incident data 152B, monitoring data 154B, runbook data 156B, and/or other data, via a user interface, such as user interface 140. In some examples, the incident service 130 provides to a user computing device 114 incident data 152B, monitoring data 154B, runbook data 156B, and/or other data for display within user interface 140, such as a graphical user interface ("GUI").

Incident configuration data 152 may include data for configuring one or more metrics/alarms utilized for detecting an incident that is associated with a service interruption. In some configurations, the incident service 130 may be configured to detect changes in network connectivity associated with a customer. For example, the incident service may utilize a monitoring functionality provided by one or more of the available services 120 to detect when at least a portion of functionality hosted by the service provider is not accessible by users of the customer. In other examples, the customer may utilize UI 140 to configure incident detection utilizing one or more UI elements 144. For example, an authorized user 122 may configure various alarms (e.g., a location is unreachable, a component stops working, a storage location is full, memory use is exceeding some predefined value, a computing resource hosting functionality utilized by the customer has experienced a failure, and the like). The user 122 might also configure the alarms based on other criteria, such as a number of orders within a time period below a specified threshold, a number of uses of particular functionality, and the like.

In some examples, the incident service 130 may provide recommendations via the UI 140 for configuring the metrics to monitor and the alarms to set to detect an incident that is associated with a service interruption. For example, the incident service 130 may provide a list of suggested alarms to the user 122 to utilize to detect an incident relating to a service interruption. The incident configuration data 152 may be stored within the data store 150 as incident configuration data 152A, or some other data store, and at least a portion of the incident configuration data 152A may be provided as incident configuration data 152B for display within the UI 140.

As discussed above, the user 122 may configure different metrics to be monitored. For instance, the user 122 may configure monitoring of reachability between/to different network resources, monitoring of health metrics of one or more computing resources (e.g., CPU utilization, data transfer, disk usage, memory usage, bandwidth utilized, latency, and the like . . . ). In some configurations, the monitoring data 154 may include metrics that identify a performance of a computing resource and/or a network element. For example, the incident service 130 may instruct a monitoring service of the available services 120 to monitor, collect and store metrics data from various network resources, applications, and services operating in the incident response system 102.

The runbook data 156 includes data relating to one or more runbooks. As discussed briefly above, the incident service 130 may provide one or more runbooks that may include data identifying manual tasks and/or automated tasks to assist in resolving the service interruption. For example, the runbook data 156 may include predefined procedures and/or actions that are directed at resolving the service interruption. In some configurations, the incident service 130 displays a graphical representation of a runbook within the UI 140 such that the user 122 may readily identify what actions have occurred, are currently being performed, and other actions yet to be performed.

In some configurations, the incident service 130 may detect an incident associated with a service interruption in response to a triggering event. For example, in some examples, the incident service 130 receives data from one or more of the available services 120 indicating the triggering event. In other examples, the user 122 may manually trigger an event (e.g., selection of a specified event) to receive current information (e.g., metrics data) related to a specified event. When a triggering event (e.g., loss/reduced network connectivity, loss of computing resources utilized by the customer application, reduced performance by the application, and the like) is detected (e.g., by monitoring one or more metrics associated with the execution of the application) that reflects the occurrence of an incident that has customer impact, the incident service 130 may obtain relevant information from one or more services provided by the service provide network to present to one or more users of the customer experiencing the service interruption.

For instance, the incident service may provide a user interface (UI), such as a graphical UI (GUI) 140 that displays information relating to the service interruption. The UI 140 may be utilized by the customer to perform steps indicated by one or more runbooks, customize a runbook, display information for various metrics (e.g., network connectivity, throughput, processor utilization, memory utilization, storage information, . . . ). In some examples, the UI may also utilize one or more services/components provided by a third party that is not part of the service provider network.

According to some examples, the user interface 140 includes selectable UI elements 144 that allow a user 122 to select, configure, and/or specify different data to be displayed, as well as perform one or more actions (e.g., from a runbook) to assist in addressing a service interruption. For instance, in the example presented in FIG. 1, the UI elements 144 may include UI elements for configuring which incident data 152B, monitoring data 154B, runbook data 156B, and/or other data to display, UI elements 144 for performing one or more actions (e.g., one or more steps from a runbook), UI elements 144 for contacting other users regarding the service interruption, and the like.

As discussed above, the incident service 130 may determine one or more actions to perform based on actions that have been performed to respond to other service interruptions. For example, the incident service 130 may identify that performing a sequence of actions has resolved a similar service interruption in the past. In some examples, the incident service 130 may identify previous service interruptions that are similar to a current service interruption for a single customer and/or other customers. For instance, while a particular service interruption may not have occurred for one customer until now, the incident service 130 may identify that similar service interruptions have occurred for other customers of the service provider network. The incident service 130 may provide actions that were performed to resolve the similar service interruptions to the customer. These actions may/may not be combined with other actions.

According to some examples, the incident service 130 may expose an incident Application Programming Interface (API) 132. In some configurations, functionality provided by the incident service 130 may be accessed using the incident API 132 that may be a Web API. The incident API 132 might also be used to request data from one or more data stores such as data store 150, services 120, and/or other applications, and the like. Some exemplary APIs include but are not limited to specifying parameters to monitor within one or more of the services 120, specifying what data to display within the UI 140, performing one or more actions (e.g., configuring a parameter, rolling back a deployed service/application to a different version, and the like).

In some configurations, the incident service 130 may access other available services 120 to obtain data that may be used by the incident service 130. For example, the incident service 130 may access a monitoring service, an event-driven service, and a queue service (See FIG. 2 and related discussion). According to some examples, the incident service 130 stores data associated with detection of the service interruption as well as resolving the service interruption. For instance, the incident service 130 may store all or a portion of the monitoring data 154, data associated with the actions performed, messages exchanged during the service interruption and/or before/after the service interruption, data associated with reassignment of actions, and the like. In some configurations, the different data that is stored is correlated such that when a user 122 views data associated with a service interruption, the user 122 may easily view the relevant data for a particular time (e.g., see FIG. 3E). According to some examples, the incident service 130 takes a "snapshot" of data, such as monitoring data, periodically (e.g., 1 second, 2 seconds, 10 seconds, . . . ) and stores this data for later use and retrieval. As such, instead of a user 122 having to search for data relating to a service interruption, the user 122 may access the relevant data from a single user interface 140. Further, unlike other monitoring data that may be discarded, the monitoring data 154, as well as other data, may be stored for a specified period of time by the user 122, or some other authorized user. Additional details regarding the various processes described above with regard to FIG. 1 will be provided below with regard to FIGS. 2-8.

Figure 2:
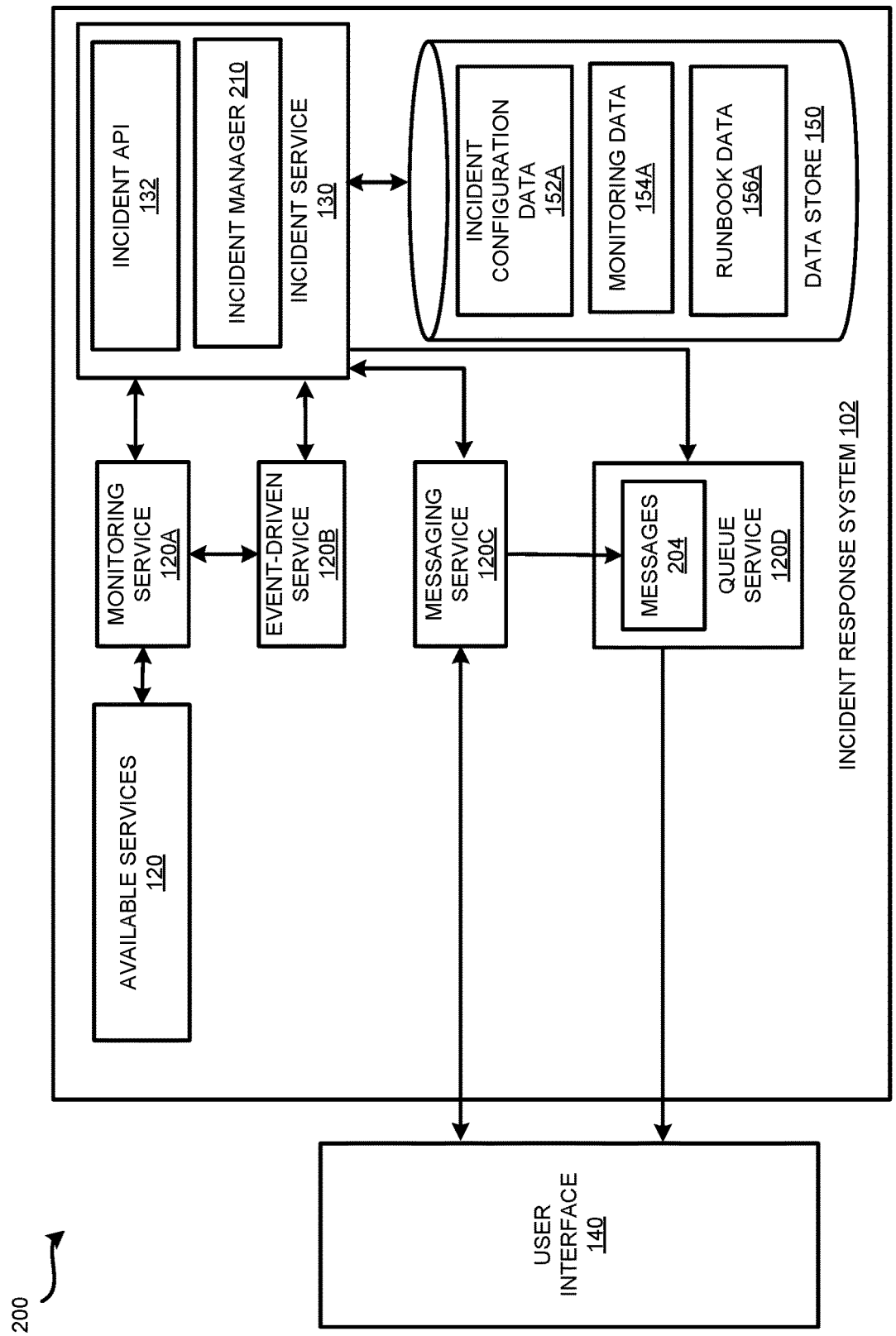
FIG. 2 is a software and network architecture diagram showing aspects of an incident response system that utilizes various services associated with a service provider to facilitate shortening service interruptions.

FIG. 2 is a software and network architecture diagram showing aspects of an incident response system 102 that utilizes various services 120 associated with a service provider network to facilitate shortening and/or minimizing a service interruption. It is to be appreciated that the environment 200 is merely illustrative and that the various configurations disclosed herein can be utilized in many different types of computing environments. FIG. 2 is similar to FIG. 1 but provides more details of the incident response system 102.

As illustrated, incident response system 102 includes incident service 130, monitoring service 120A, event-driven service 120B, messaging service 120C, and queue service 120D. The incident service 130 may communicate with the services 120 using one or more Application Programming Interfaces (APIs), such as incident API 132 exposed by the incident service 130. In some examples, each service may expose one or more APIs (not shown) that can be used by a service, or some other component or application, to access functionality and/or data provided by the service.

In some examples, the incident service 130 utilizes a monitoring service 120A to monitor various metrics associated with one or more of the available services 120. For example, the monitoring service 120A monitors one or more of the available services 120 to identify incidents/problems that may indicate a service interruption (e.g., network connectivity, health data, other data), which may correspond to monitoring data 154. The monitoring service 120A may provide the monitoring data 154 related to detecting a service interruption to the incident manager 210, the incident service 130 and/or some other computing device or component. The incident service 120A, or some other component or user, may configure the monitoring service 120A to detect triggering events indicating a service interruption by monitoring metrics/events based on incident data 152.

When a triggering event is detected, the incident manager 210 may attempt to identify one or more users 122 to which to engage to assist in resolving the service interruption, and/or perform other actions without user interaction. As discussed above, the customer may identify the users 122 that are assigned to resolve the service interruption. According to some configurations, the incident manager utilizes a messaging service 120C to send an electronic message (e.g., a text message, email, a notification via a mobile application, a desktop application, and/or a website, . . . ) to the users assigned to resolve the service interruption.

The incident service may also perform other actions in an attempt to quickly resolve the service interruption. For example, the incident service 130 may restart a service, device, component, or perform some other action (e.g., adding/replacing a computing resource utilized by the application, changing an amount of memory allocated to the application, . . . ) in a fully or partially automated manner, and possibly without requiring any input from a user associated with the entity experiencing the service interruption. As another example, the incident service 130 may automatically change a version of an service/application being utilized. In case of service interruptions that cannot be automatically resolved, the incident service 130 may present detailed incident data 152B, and/or other diagnostic information to the user (e.g., using UI 140).

According to some configurations, the event-driven service 120B is configured to detect a triggering event, such as an alarm that is triggered in response to the monitoring service identifying a change in one or more parameters that are monitored by monitoring service 120A. In response to the triggering event, the incident service 130 may generate a message 204 that is provided to the messaging service 120C and/or the queue service 120D for delivery to the user 122 via the UI 140.

The queue service 120D can be a managed message queuing service that provides messaging for applications and/or services, such as incident service 130. The queue service 120D helps to remove the complexity and overhead associated with managing and operating message-oriented middleware and empowers developers to focus on other tasks. As illustrated, queue service 120D is configured to store messages utilized by the incident service 130 to assist in addressing a service interruption. As illustrated, the queue service 120D queues messages 204 generated by the event-driven service 120B.

Figure 3A:
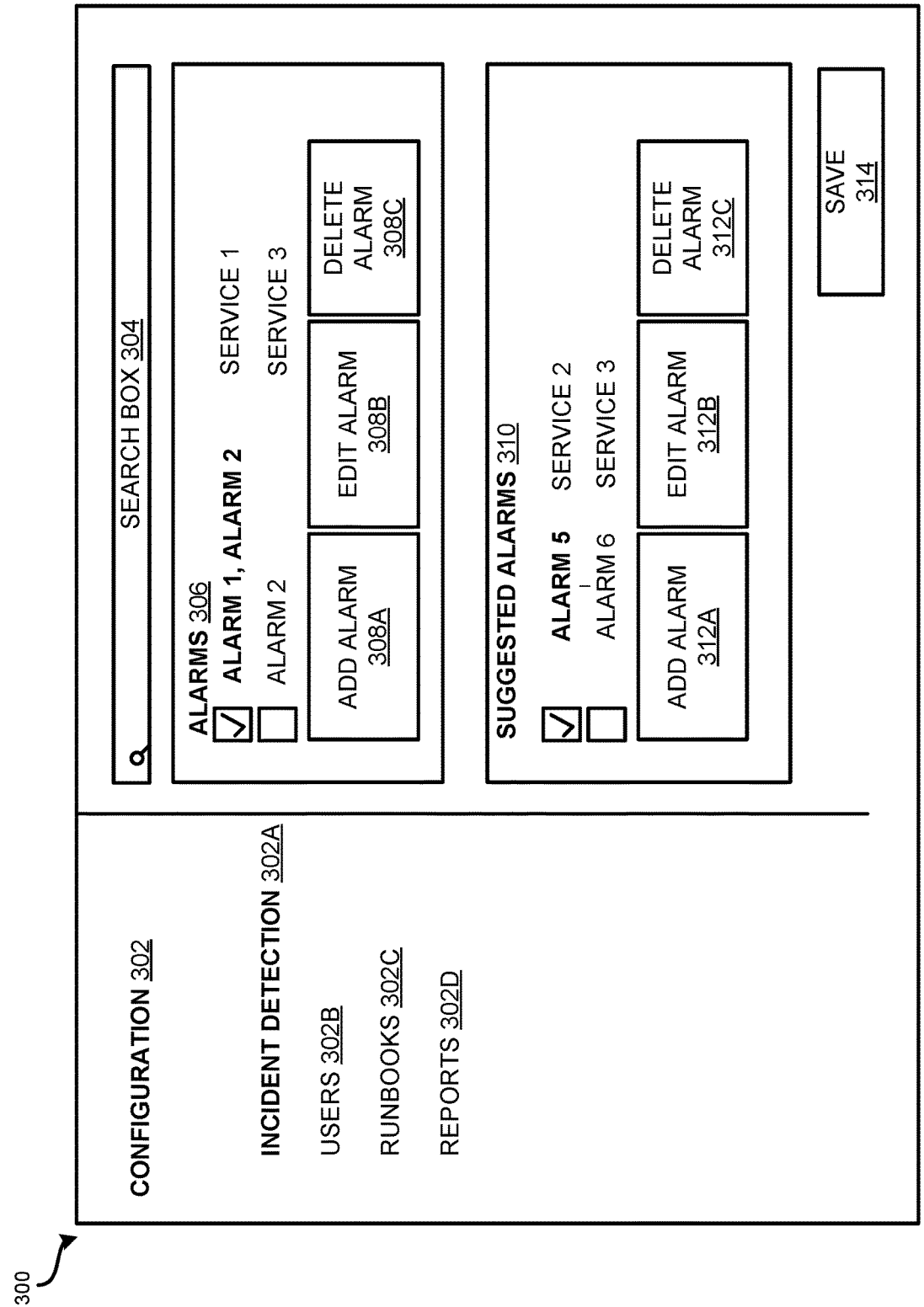
FIG. 3A is a block diagram showing an illustrative graphical user interface that may be utilized to configure incident detection to identify service interruptions.

FIG. 3A is a block diagram showing an illustrative graphical user interface 300 that may be utilized to configure incident detection to identify service interruptions. In some examples, the user 122 configures alarms to identify incidents associated with service interruptions via a graphical user interface (GUI). In other examples, the user may use a command line interface, or utilize an Application Programming Interface (API). In some instances, the instance service 130 may provide data for displaying a GUI to a display associated with a user computing device (not shown).

In the example illustrated in FIG. 3A, GUI 300 shows user interface (UI) elements related to identifying and configuring alarms that may be utilized to detect one or more incidents that are associated with a service interruption. More or fewer UI elements 144 may be included within GUI 300. As illustrated, the GUI 300 includes configuration UI element 302 that allows a user 122 to configure alarms 306 and select from suggested alarms 310. The GUI 300 also shows a search UI element 304 to enter one or more search terms to locate alarms. According to some configurations, the user 122 may select incident detection UI element 302A to configure one or more alarms that are used as a triggering event to identify a service interruption.

In the current example, the alarms UI element 306 displays alarms currently being utilized to detect a service interruption. The user 122 may select one or more of the alarms (e.g., as indicated by the checkmark next to alarm 1, alarm 2 associated with service 1) and then edit the alarm using edit alarm UI element 308B, or delete the alarm using the delete alarm UI element 308C. The user 122 may also add a new alarm using add alarm UI element 308A.

According to some configurations, the display of the GUI 300 may also include suggested alarms UI element 310 that includes alarms identified by the incident service 130, or some other component, or entity as being related to detecting an incident that indicates a service interruption. In this way, the user 122 may more easily add relevant alarms without having to search for available alarms. The user 122 may select one or more of the suggested alarms (e.g., as indicated by the checkmark next to alarm 5) and then edit an alarm using edit alarm UI element 312B, or delete the alarm using the delete alarm UI element 312C. The user 122 may also add a new alarm using add alarm UI element 312A. The user 122 may use the save UI element 314 to save changes made to the alarms or exit if no changes are desired.

Figure 3B:
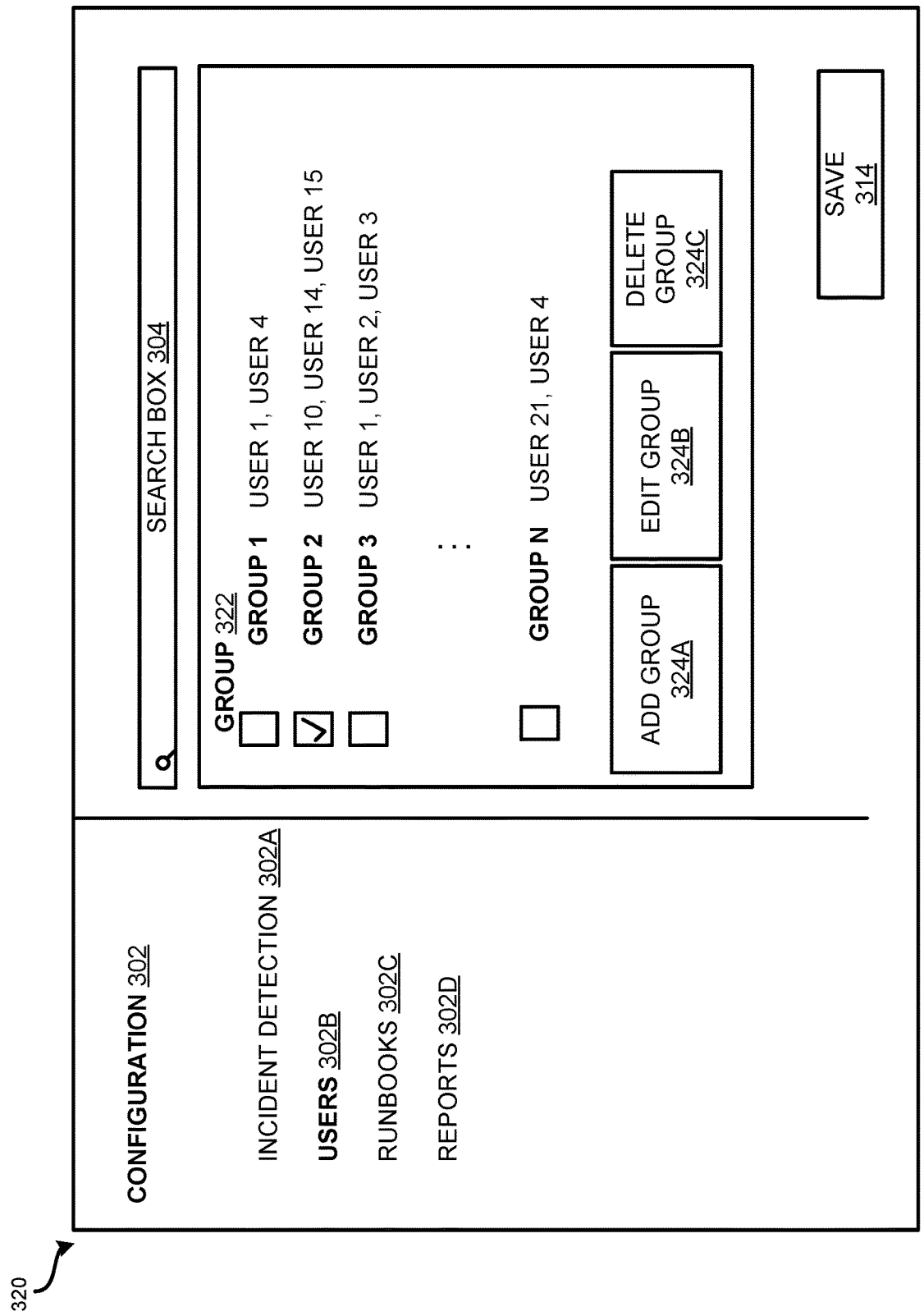
FIG. 3B is a block diagram showing an illustrative graphical user interface that may be utilized to configure users/groups that may be identified to respond to a detected service interruption.

FIG. 3B is a block diagram showing an illustrative graphical user interface that may be utilized to configure users/groups that may be identified to respond to a detected service interruption. As discussed above, the user 122 may identify one or more users to be utilized in responding to a detected service interruption.

In the example illustrated in FIG. 3B, GUI 320 shows user interface (UI) elements related to configuring one or more groups. A group may include one or more users. More or fewer UI elements may be included within GUI 320. As illustrated, the GUI 320 configuration UI elements 302 that allows a user 122 to configure the users to respond to a service interruption, a search UI element 304 to enter one or more search terms to locate users. A group UI element 322 may also be provided that displays group information. The group information may include information about users 122 within a group (e.g., names, office locations, phone numbers, availability information, . . . ). The edit group UI element 324B when selected is used to edit group information for a selected group. For instance, a user 122 may select a group (e.g., group 2 as indicated by the checkmark) to edit information about the group. The user 122 may delete a group using the delete group UI element 324C or add another group using the add group UI element 324A. The user 122 may use the save UI element 314 to save changes made to the alarms or exit if no changes are desired.

Figure 3C:
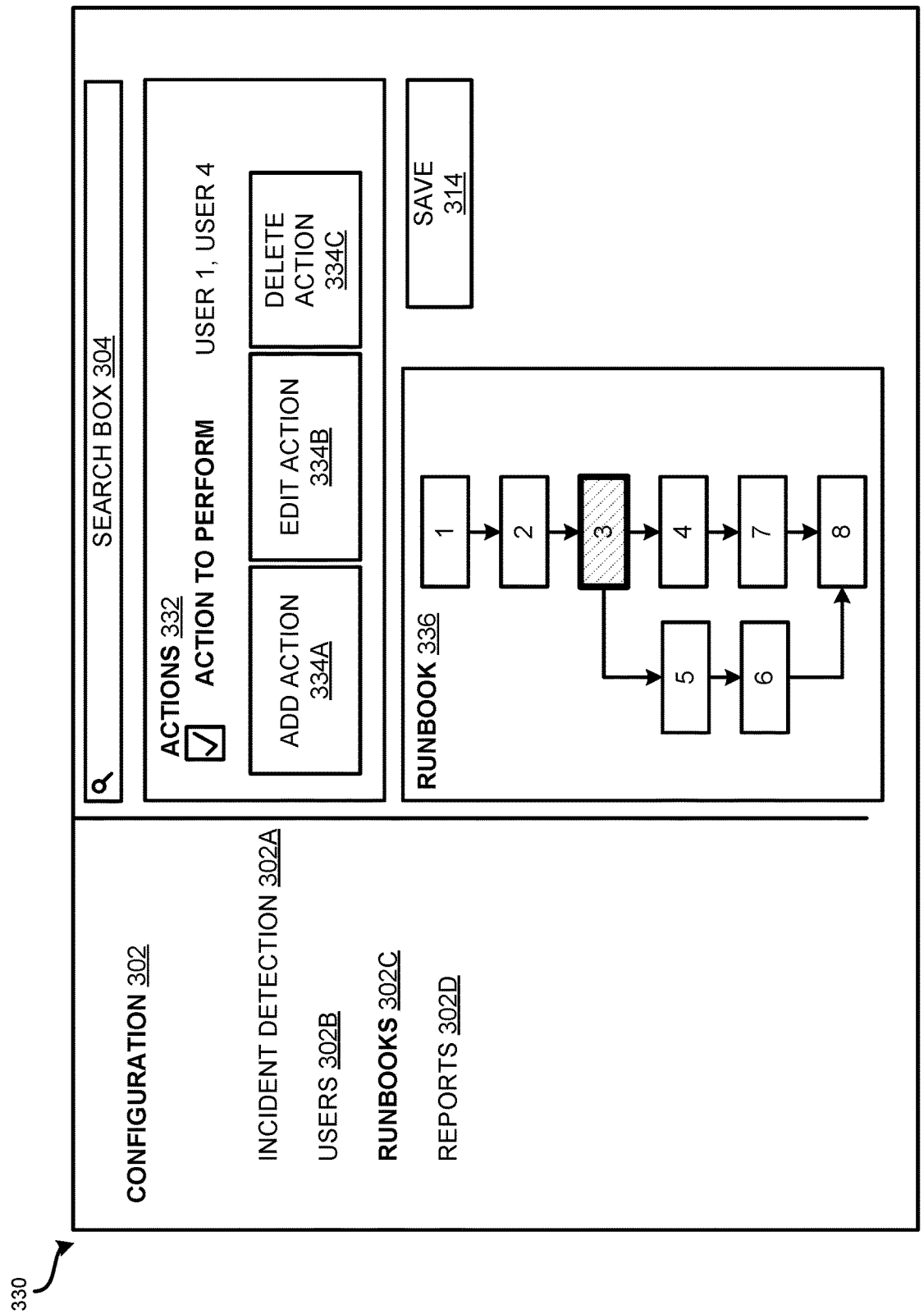
FIG. 3C is a block diagram showing an illustrative graphical user interface that may be utilized to configure runbook data to display to respond to a detected service interruption.

FIG. 3C is a block diagram showing an illustrative graphical user interface that may be utilized to configure runbook data 156 to display to respond to a detected service interruption. As discussed above, the user 122 may identify one or more runbooks to utilize when responding to a service interruption.

In the example illustrated in FIG. 3C, GUI 330 shows user interface (UI) elements related to configuring runbook data 156. More or fewer UI elements may be included within GUI 330. As illustrated, the GUI 330 configuration UI elements 302 that allows a user 122 to configure runbook information utilized to respond to a service interruption, and a search UI element 304 to enter one or more search terms to locate runbook information. An actions UI element 332 may also be provided that displays one or more actions to perform for a particular step within the runbook. In the current example, the actions UI element 332 illustrates that actions to perform for step 3 of the runbook 336. The edit action UI element 334B when selected is used to edit the action(s) to perform for the selected step. For instance, a user 122 may select a step (e.g., step 3 as indicated by the larger border and hashing fill) to edit information about the action(s) for step 3. The user 122 may delete an action using the delete action UI element 334C or add another action using the add action UI element 334A. The user 122 may use the save UI element 314 to save changes made to the alarms or exit if no changes are desired.

GUI 330 also illustrates a runbook UI element 336 that presents the action items/tasks that are associated with a runbook. As illustrated, the runbook UI element 336 include a list of 8 action items. More or fewer action items may be included within a runbook. In some configurations, the different action items are selectable.

FIG. 3D is a block diagram showing an illustrative graphical user interface that may be utilized to configure data to display to respond to a detected service interruption. As discussed above, the user 122 may identify various information to utilize when responding to a service interruption.

In the example illustrated in FIG. 3D, GUI 340 shows user interface (UI) elements related to configuring reports and/or data that may be displayed in the UI 140 when responding to a service interruption. More or fewer UI elements may be included within GUI 340. As illustrated, the GUI 340 configuration UI elements 302 that allows a user 122 to configure the UI 140 utilized to respond to a service interruption, and a search UI element 304 to enter one or more search terms to locate information associated with content included in the GUI 340. The timeline UI element 342 may also be provided that displays a timeline of actions taken during responding to a service interruption. As actions are performed, the incident service 130 may update the timeline UI element 342.

The chat box UI element 344 may be provided that shows messages exchanged while responding to the service interruption. In this way, users assigned to respond to the service interruption may see messages and other relevant information within a same UI 140 instead of having to utilize a variety of different applications/programs. The metrics UI element 346 shows monitoring data 154 that is associated with the alarm(s) that caused the triggering event. For example, the monitoring data may include network connectivity data when an alarm was triggered indicating a loss of network connectivity. The tasks UI element 348 may be provided to display the list of tasks that have been completed/as well as tasks that have not been completed. The runbook UI element 336 illustrates the steps within the selected runbook. In the current example, the runbook UI element 336 shows that step 4 is the current step to utilize.

Figure 3E:
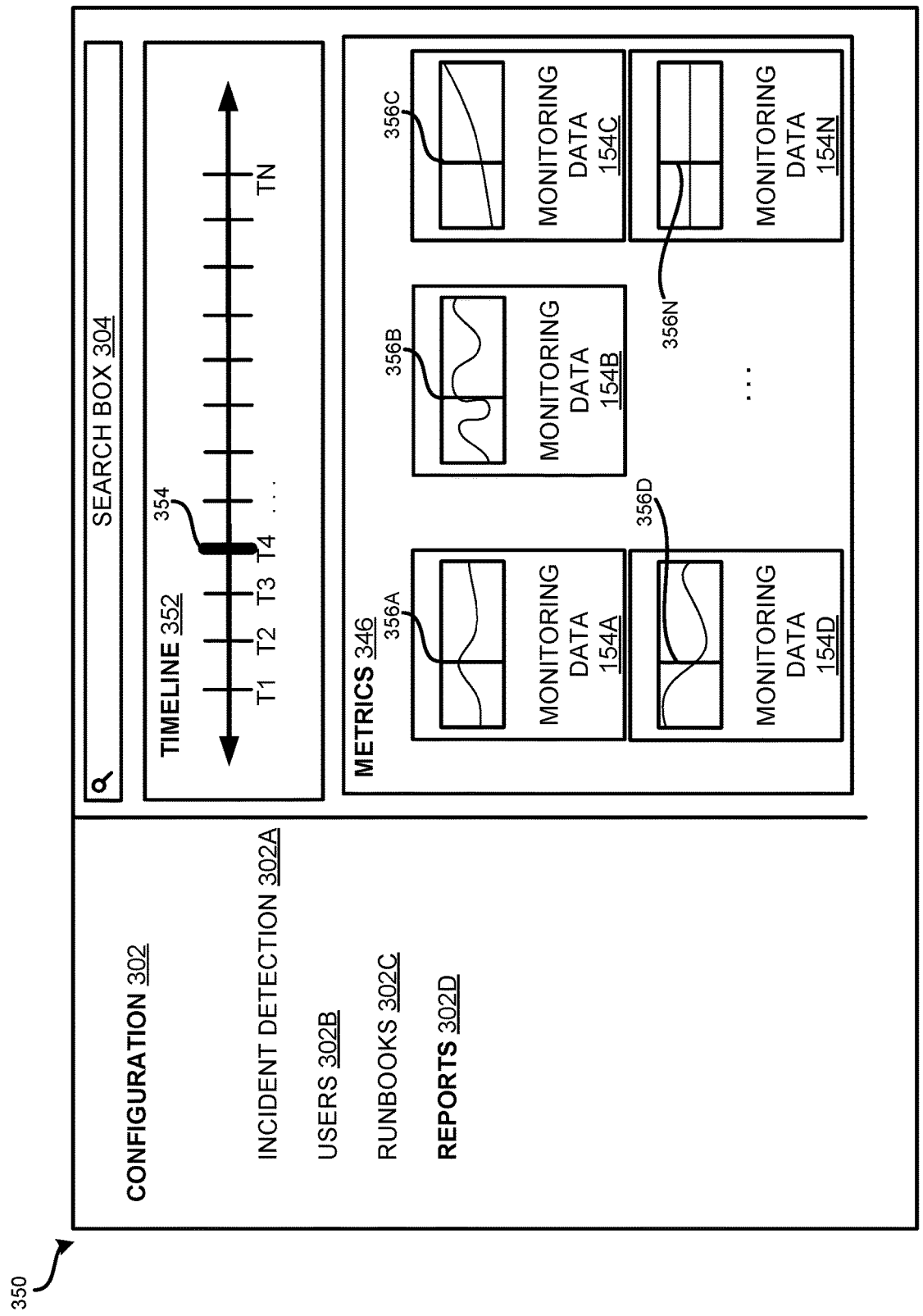
FIG. 3E is a block diagram showing an illustrative graphical user interface that may be utilized to view a selected time within different metrics data to respond to a detected service interruption.

FIG. 3E is a block diagram showing an illustrative graphical user interface that may be utilized to view a selected time within different metrics data to respond to a detected service interruption. As discussed above, the user 122 may identify various information to utilize when responding to a service interruption.

In the example illustrated in FIG. 3E, GUI 350 shows user interface (UI) elements related to viewing reports and/or data within the UI 140 when responding to a service interruption. More or fewer UI elements may be included within GUI 350. As illustrated, the GUI 350 configuration UI elements 302 that allows a user 122 to configure the UI 140 utilized to respond to a service interruption, and a search UI element 304 to enter one or more search terms to locate information associated with content included in the GUI 340. The timeline UI element 352 may also be provided that displays a timeline that includes different times associated with responding to a service interruption. As illustrated, the timeline UI element 352 includes different times (T1, T2, . . . . TN) that a user may select. In the current example, the user has selected to view data associated with time T4 as indicated by indicator 3544.

According to some examples, in response to selection of a time on the timeline UI element 352, the metrics UI element 346 may be updated to display monitoring data 154 at the selected time. For instance, monitoring data 154A shows a graph that has an indicator 356A at the selected time T4, monitoring data 154B shows a graph that has an indicator 356B at the selected time T4, monitoring data 154C shows a graph that has an indicator 356C at the selected time T4, monitoring data 154D shows a graph that has an indicator 356D at the selected time T4, and monitoring data 154N shows a graph that has an indicator 356N at the selected time T4.

In this way, users assigned to respond to the service interruption may see the monitoring data 154 at the same point in time within the UI 140 instead of having to manually select different views for the specified time. As discussed above, the metrics UI element 346 shows monitoring data 154 that is associated with the alarm(s) that caused the triggering event. For example, the monitoring data 154 may include network connectivity data when an alarm was triggered indicating a loss of network connectivity.

Figure 4:
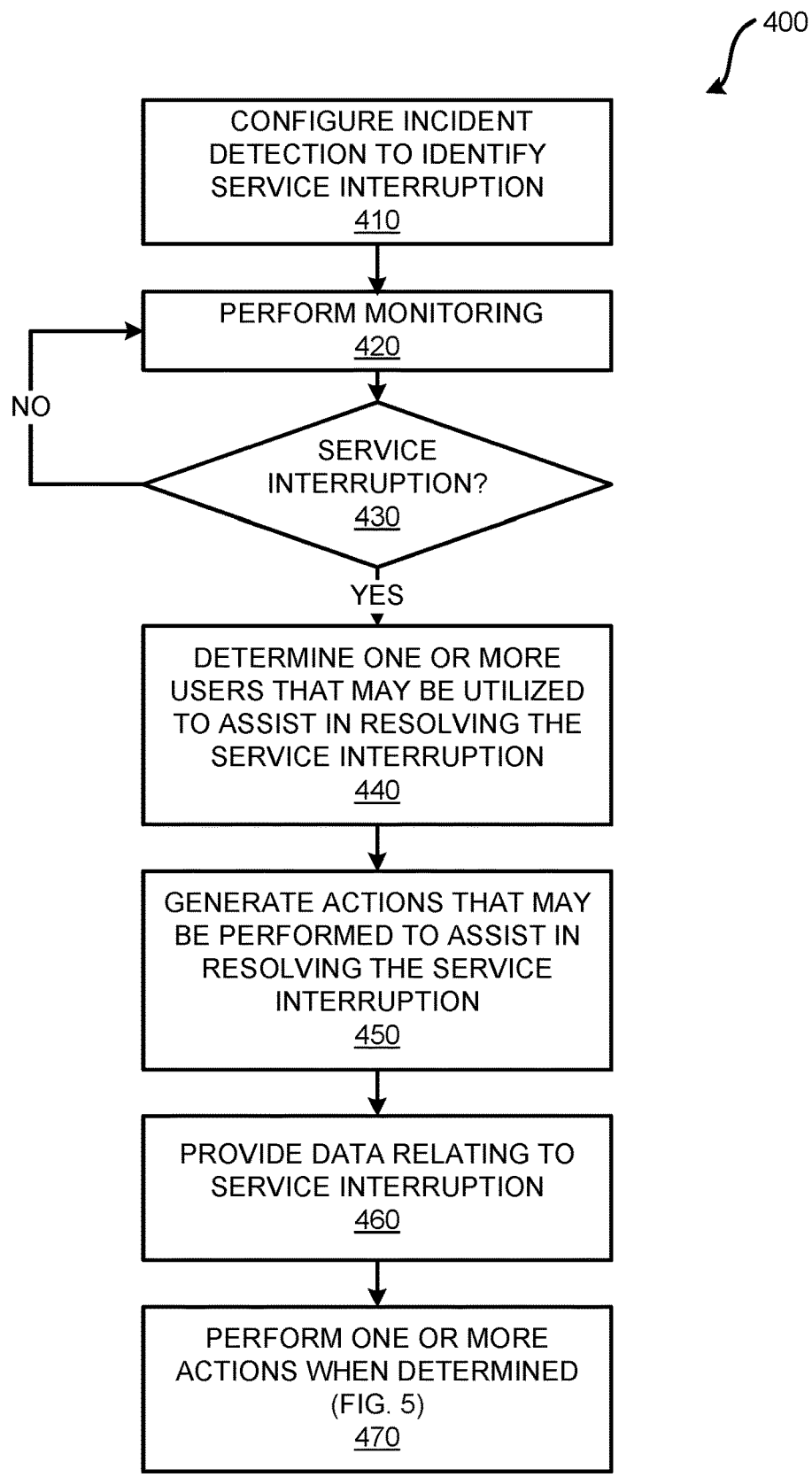
FIG. 4 is a flow diagram showing an illustrative routine for shortening service interruptions.
Figure 5:
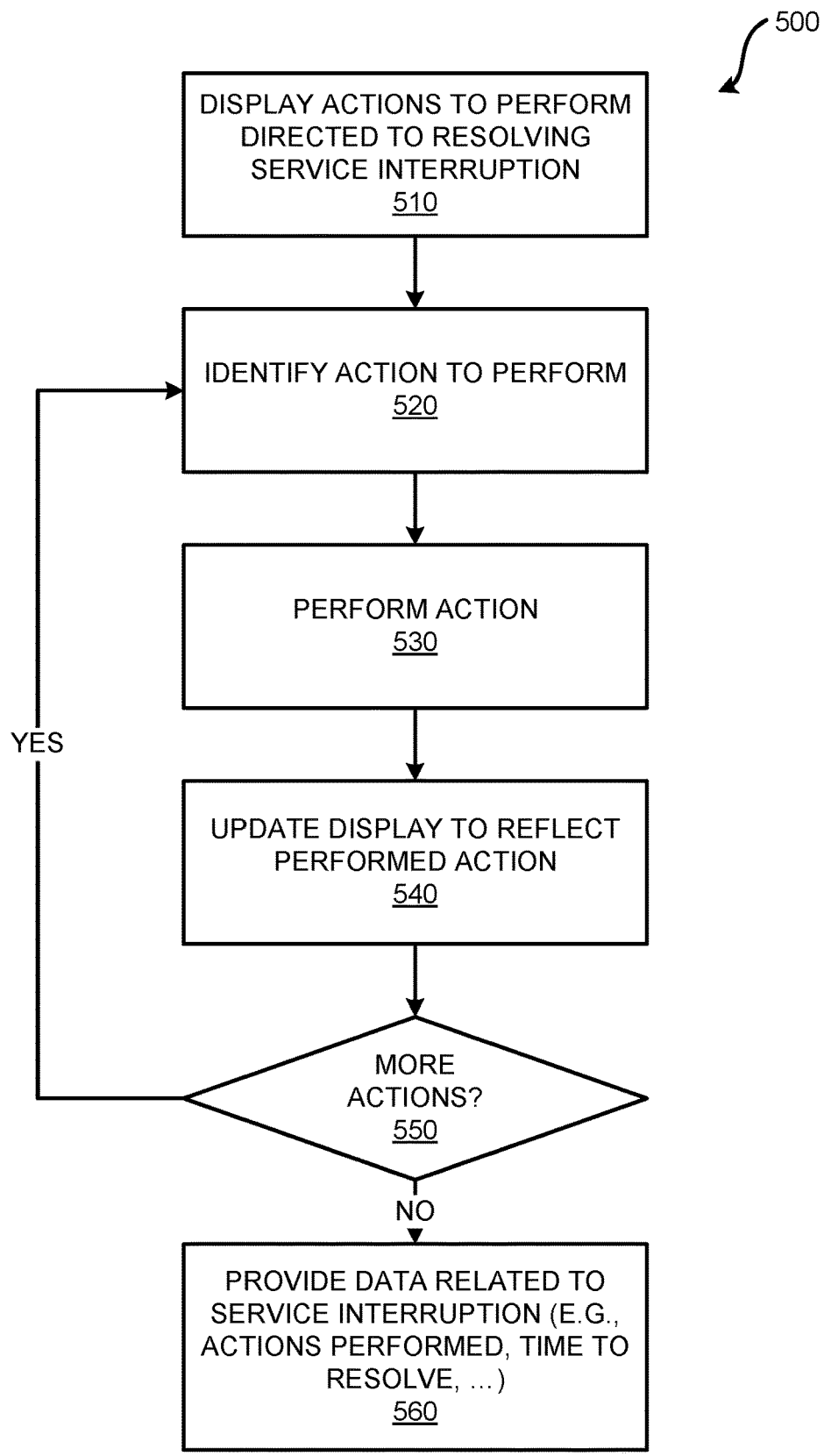
FIG. 5 is a flow diagram showing an illustrative routine for performing one or more actions to shorten service interruptions.

FIGS. 4 and 5 are flow diagrams showing illustrative routines 400, and 500, for shortening and/or minimizing service interruptions, according to examples disclosed herein. It should be appreciated that the logical operations described herein with respect to FIG. 4, FIG. 5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine 400 for shortening and/or minimizing service interruptions. At 410, a user 122 configures incident detection to identify a service interruption. As discussed above, the incident service 130 may utilize incident configuration data 152 to configure one or more triggering events to identify a service interruption. According to some examples, the incident configuration data 152 is utilized by a monitoring service 120A to configure monitoring of one or more available services 120. For example, the incident configuration data 152 may specify that a triggering event occurs in response to a value of one or more metrics (e.g., network connectivity metrics, health metrics, . . . ) indicating an occurrence of a service interruption. For instance, the user 122 may configure monitoring of reachability between/to different network resources, monitoring of health metrics of one or more computing resources (e.g., CPU utilization, data transfer, disk usage, memory usage, bandwidth utilized, latency, and the like . . . ). In some configurations, the monitoring data 154 may include metrics that identify a performance of a computing resource and/or a network element.

At 420, monitoring is performed. As discussed above, the incident service 130 may utilize a monitoring functionality provided by one or more of the available services 120, such as monitoring service 120A, to detect when at least a portion of functionality hosted by the service provider network is not accessible by users accessing functionality associated with the customer. In some configurations, the incident service 130 may instruct the monitoring service 120A to monitor, collect, and store metrics data from various network resources, applications, and services operating in the data store 150, or some other memory, associated with the incident response system 102.

At 430, a decision is made as to whether a service interruption has occurred. As discussed above, the incident service 130 may receive a notification of a triggering event from another service 120, or some other component that indicates occurrence of a service interruption. In other examples, the incident service 130 may receive or access monitoring data 154 to determine whether a service interruption has occurred. When a service interruption has not occurred, the routine returns to 420. When a service interruption has occurred, the routine moves to 440.

At 440, one or more users that may be utilized to assist in resolving the service interruption are determined. As discussed above, the incident service 130 may access data, such as incident configuration data 152, and/or other data, to determine individuals associated with the entity to resolve the service interruption. In some examples, the user 122 may identify one or more users to assist in resolving the service interruption utilizing the UI 140.

At 450, actions are generated that may be performed to assist in resolving the service interruption. As discussed above, in some examples, the incident service 130 may generate and/or access runbook data 156 that includes data relating to one or more runbooks. In some examples, the runbook data 156 identifies manual tasks and/or automated tasks to assist in resolving the service interruption. For instance, the runbook data 156 may include predefined procedures and/or actions that are directed at resolving the service interruption.

At 460, data relating to the service interruption is provided. As discussed above, the incident service 130 may provide data, such as incident configuration data 152, monitoring data 154, runbook data 156, and/or other data for display within the UI 140 such that the user 122 may readily identify what actions have occurred, are currently being performed, and other actions yet to be performed. In some examples, the incident service 130 transmits an electronic message to the identified users that are assigned to resolve the service interruption that indicates the occurrence of the service interruption.

At 470, one or more actions are performed when determined. As discussed above, a user may utilize the UI 140 to perform an action (e.g., by entering or selecting a command from the runbook), and/or the incident service 130 may automatically perform a command. For instance, the incident service 130 may restart one or more processes/services in an attempt to address the service interruption.

FIG. 5 is a flow diagram showing an illustrative routine 500 for performing one or more actions to shorten and/or minimize service interruptions, according to examples disclosed herein.

The routine 500 begins at 510, where actions are displayed that are directed at resolving the service interruption. As discussed above, the incident service 130 may provide data, such as runbook data 156B, for display within a UI 140. In some examples, the runbook data 156 is displayed within the UI 140 as a graph of different ordered actions.

At 520, an action to perform is identified. As discussed above, an action may be manually performed and/or automatically performed by the incident service 130. In some examples, the user 122 identifies an action to perform by making a selection of a UI element 144 (e.g., a box with the desired action).

At 530, the action is performed. As discussed above, the incident service 130 may cause the action the action to be performed in response to the selection, or in response to some other event or condition.

At 540, the display is updated to reflect the performed action. As discussed above, the incident service 130 may update the UI 140 to reflect the performed action (e.g., changing an indictor within the UI 140). In some examples, the incident service 130 changes a display of an action of the runbook to reflect the performed action.

At 550, a decision is made as to whether there are more actions to perform. As discussed above, when the incident manager 160 determines that there are more actions, the process 500 returns to 530. When there are not more actions to perform, the process flows to 560.

At 560, data related to the resolving of the service interruption may be provided. As discussed above, the incident service 130 may provide data relating to the actions performed, when actions were performed, messages associated with resolving the service interruption between users assigned to resolve the interaction, and the like.

Figure 6:
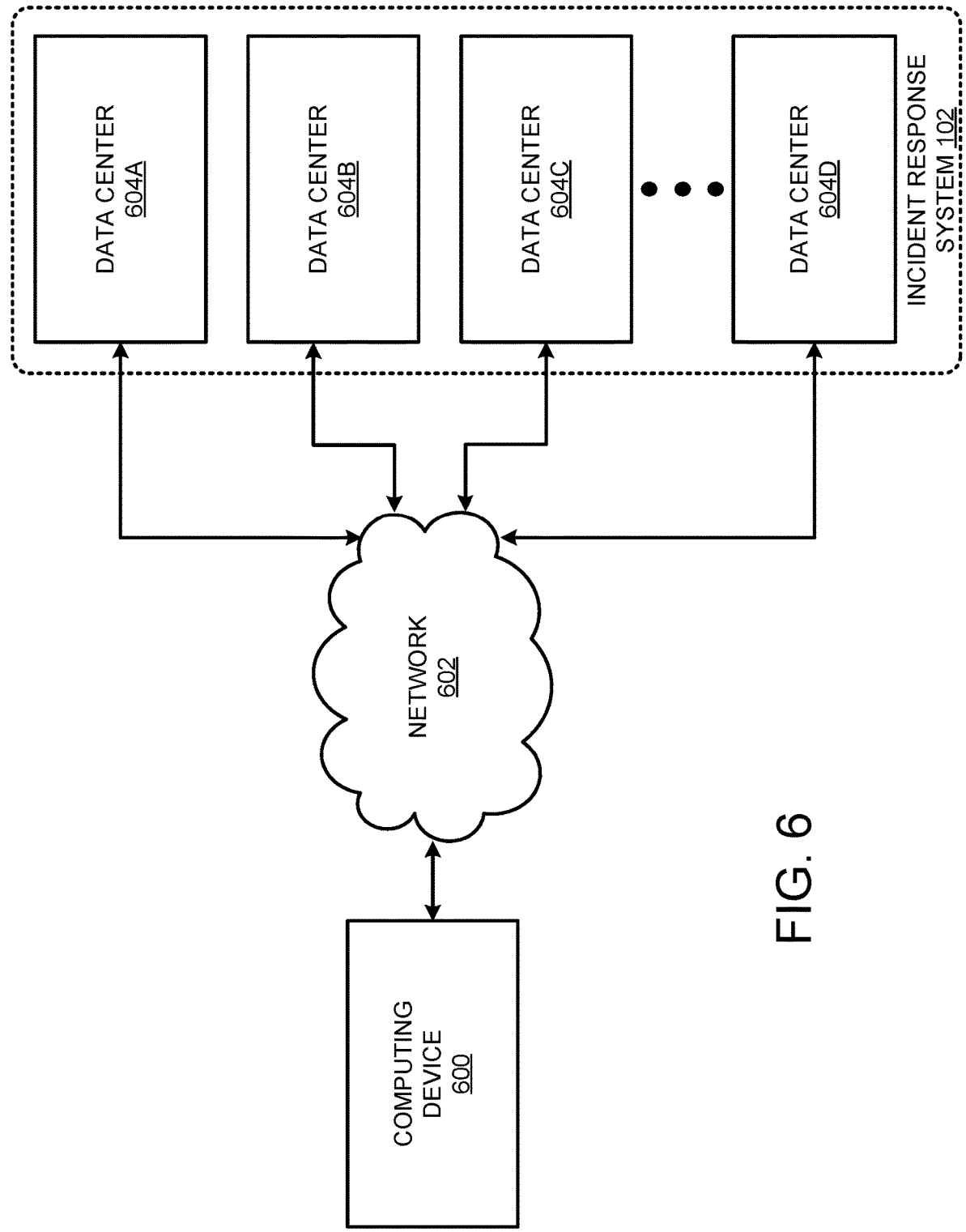
FIG. 6 is a system and network diagram that shows an illustrative operating environment including several data centers that can be configured to implement aspects of the functionality described herein.

FIG. 6 is a system and network diagram that shows an illustrative operating environment for the configurations disclosed herein that includes an incident response system 102 that can be configured to provide the functionality described above. As discussed above, the incident response system 102 can execute network services that provide computing resources for implementing the functionality disclosed herein. The computing resources implemented by the incident response system 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The incident response system 102 can also include and utilize other types of computing resources not mentioned specifically herein.

As also discussed above, the computing resources provided by the incident response system 102 are enabled in one implementation by one or more data centers 604A-604D (which might be referred to herein singularly as "a data center 604" or collectively as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 8.

The users can access the services provided by the incident response system 102 over a network 602, which can be a wide area communication network ("WAN"), such as the Internet, an intranet or an Internet service provider ("ISP") network or a combination of such networks. For example, and without limitation, a computing device 600 operated by a user or other user of the incident response system 102, such as the computing device 114, can be utilized to access the incident response system 102 by way of the network 602. It should be appreciated that a local-area network ("LAN"), the Internet, or any other networking topology known in the art that connects the data centers 604 to remote users and other users can be utilized. It should also be appreciated that combinations of such networks can also be utilized.

Figure 7:
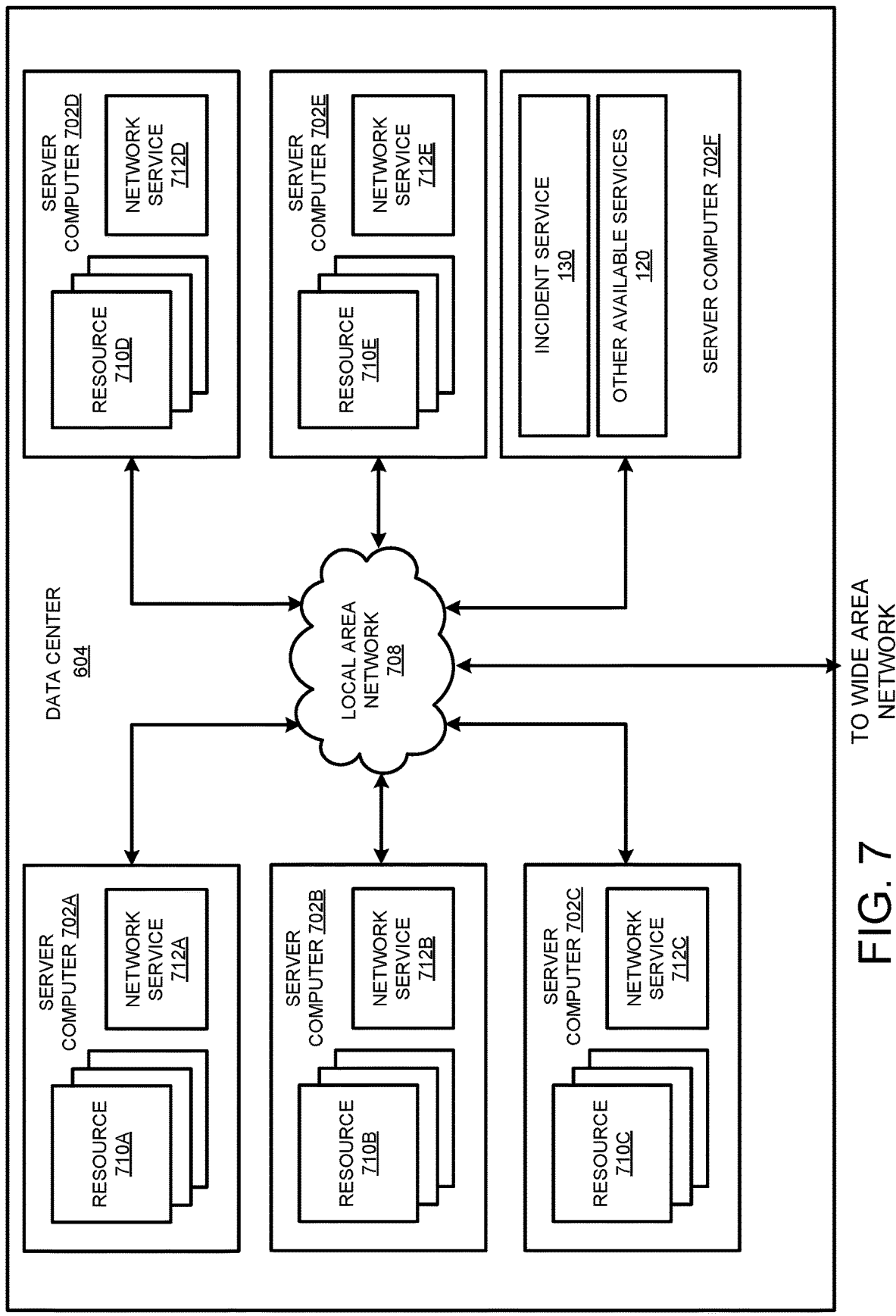
FIG. 7 is a computing system diagram illustrating a configuration for a data center that can be utilized to implement aspects of the technologies disclosed herein.

FIG. 7 is a computing system diagram that illustrates examples for a data center 604 that can be utilized to implement the incident service 130, other available services 120, and the other functionality disclosed herein. The example data center 604 shown in FIG. 7 includes several server computers 702A-702F (which might be referred to herein singularly as "a server computer 702" or in the plural as "the server computers 702").

The server computers 702 can be standard tower, rack-mount, or blade server computers configured appropriately for providing various types of computing resources 710 for implementing the functionality disclosed herein. As mentioned above, the computing resources 710 provided by the data center 604 can be data processing resources such as VM instances or hardware computing systems, data storage resources, database resources, networking resources, and others. Some of the servers 702 can also be configured to execute network services 712A-712-E, respectively, capable of instantiating, providing and/or managing the computing resources 710A-710E.

The data center 604 shown in FIG. 7 also includes a server computer 702F that can execute some or all of the software components described above. The server computer 702F can also be configured to execute other components and/or to store data for providing some or all of the functionality described herein. In this regard, it should be appreciated that components or different instances of the services can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604D, between each of the server computers 702A-702F in each data center 604, and, potentially, between computing resources 710 in each of the data centers 604. It should be appreciated that the configuration of the data center 604 described with reference to FIG. 7 is merely illustrative and that other implementations can be utilized.

Figure 8:
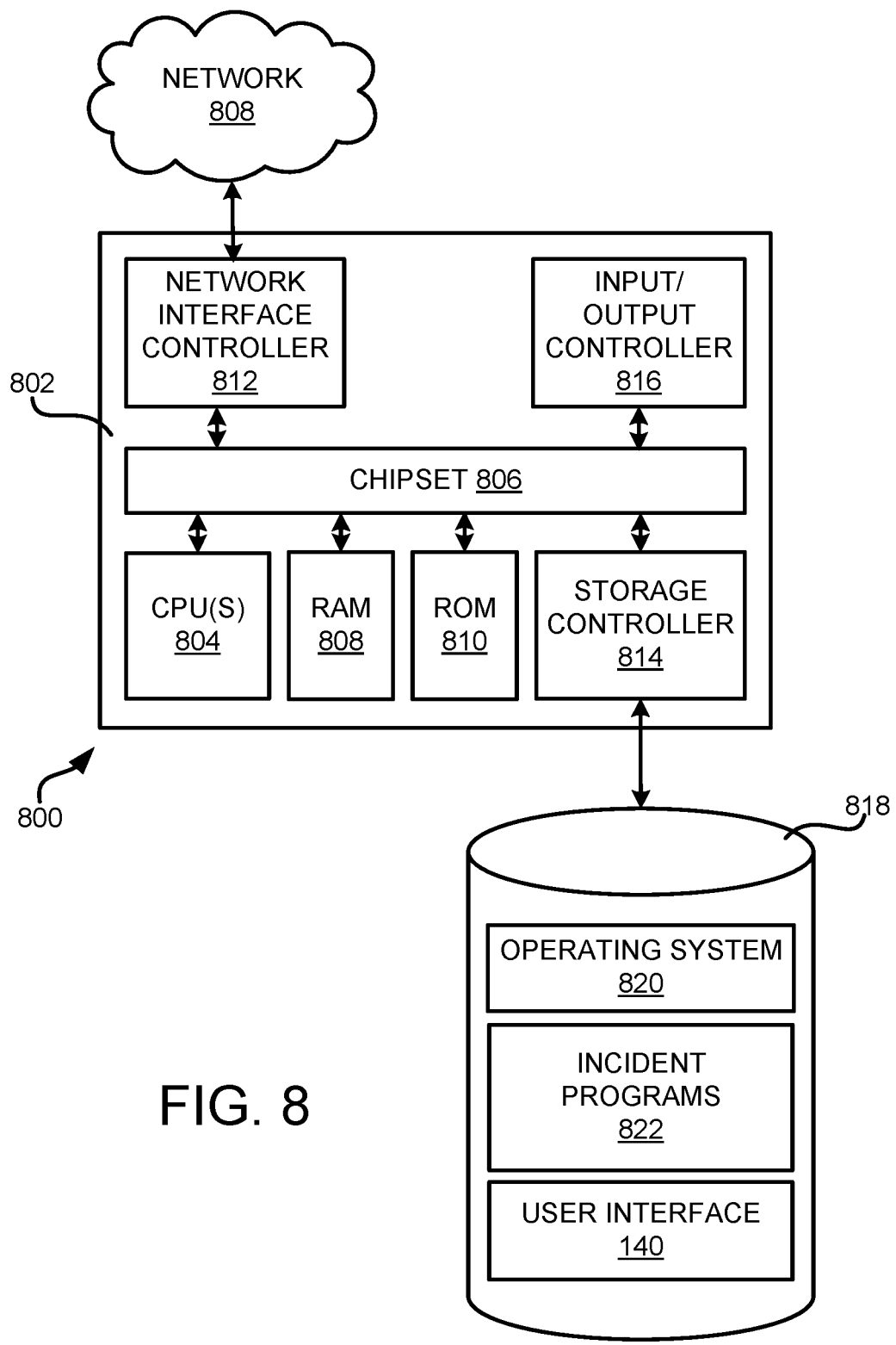
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 808. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, incident programs 822 for providing functionality associated with the incident response system 102, user interface 140, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In examples, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to examples, the computer 800 has access to computer-readable storage media storing computer-executable instructions which, when executed by the computer 800, perform the various processes described above with regard to FIGS. 1-8. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for shortening service interruptions have been described herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
   one or more processors; and
   a non-transitory computer-readable storage medium having instructions stored thereupon which, when executed by the one or more processors, cause the system to:
   provide, for display within a graphical user interface (GUI) of a computing device associated with a customer, a list of suggested alarms to utilize to detect an incident relating to one or more service interruptions;
   receive, via the GUI and from the computing device, a selection of an alarm of the list of suggested alarms;
   identify an occurrence of the alarm, wherein the alarm indicates a service interruption that impacts, for a plurality of customers of a service provider network, access to functionality of an application that is hosted by the service provider network and that is developed by the customer of the service provider network;
   identify a group of users, assigned to resolve the service interruption, to notify, wherein the group of users is associated with the customer;
   transmit, an electronic message to the group of users, wherein the electronic message indicates the service interruption;
   identify actions that are associated with resolving the service interruption, wherein at least a portion of the actions are based on first previous actions performed within the service provider network to resolve first previous service interruptions that are a same as the service interruption and second previous actions performed within the service provider network to resolve second previous service interruptions that are determined to be similar to the service interruption, but that are different than the service interruption, and that have yet to occur with respect to the plurality of customers, wherein the actions include predefined manual procedures and predefined automated procedures directed to resolving the service interruption, and wherein the actions include re-starting a first service associated with the service provider network without receiving first user input associated with the first service and configuring a second service associated with the service provider network without receiving second user input associated with the second service;

provide, for display within the GUI of the computing device:
- a runbook user interface (UI) element that presents a graphical representation of the actions to perform to resolve the service interruption;
- metric data that is identified as causing the alarm; and
- a chat UI element that presents messages exchanged between the group of users during a time associated with resolving the service interruption;

in response to a selection of an action of the actions from the runbook UI element, perform the action;

update the GUI to indicate that the action has been performed; and update the GUI to indicate a next action to be performed.

2. The system of claim 1, wherein the instructions further cause the system to:
obtain the metric data from a monitoring service of the service provider network, the metric data including first metrics associated with network connectivity of the application and second metrics associated with computing resources utilized by the application;
store the metric data; and
provide for display within the GUI, a graphical representation of at least a portion of the metric data that relates to the service interruption.

3. The system of claim 1, wherein the instructions further cause the system to display within the GUI, a timeline of activities that occur during the time associated with resolving the service interruption and configuration UI elements that, when selected, are utilized to configure the alarm.

4. The system of claim 1, wherein the instructions further cause the system to identify the second previous service interruptions that occurred within the service provider network that are similar to an incident causing the service interruption.

5. A computer-implemented method comprising:
detecting a triggering event that indicates a service interruption that impacts, a plurality of customers of a service provider network, access to functionality hosted by the service provider network on behalf of a customer of the service provider network;
notifying one or more users assigned to resolve the service interruption, wherein the one or more users are associated with the customer;
identifying actions that are associated with resolving the service interruption based at least in part on one or more first previous actions performed within the service provider network to resolve one or more first previous service interruptions that are a same as the service interruptions and one or more second previous actions performed within the service provider network to resolve one or more second previous service interruptions that are determined to be similar to the service interruption, but that are different than the service interruption, and that have yet to occur with respect to the plurality of customers, at least one of the one or more first previous actions or the one or more second previous actions being associated with the one or more users, and wherein the actions include re-starting a service associated with the service provider network or re-starting a device associated with the service provider network;
providing, for presentation within a user interface (UI):
at least one of the actions to perform; and
metric data associated with the triggering event; and
determining a first action of the actions to perform based, at least in part, on input received from the one or more users.

6. The computer-implemented method of claim 5, further comprising:
storing data associated with the actions to perform and the metric data;
receiving an indication to display at least a portion of the data; and
providing for presentation a first portion of the data associated with a first time, and a second portion of the data associated with the first time.

7. The computer-implemented method of claim 5, further comprising identifying the one or more users based, at least in part, on incident configuration data obtained from the customer of the service provider network, wherein the incident configuration data specifies one or more groups of users assigned to resolve the service interruption.

8. The computer-implemented method of claim 5, wherein notifying the one or more users comprises transmitting an electronic message to the one or more users that includes a UI element that, when selected, causes the UI to be presented.

9. The computer-implemented method of claim 5, further comprising:
obtaining the metric data from a monitoring service of the service provider network, the metric data including one or more of network connectivity data, usage data, and health data;
wherein at least a portion of the metric data is monitored based, at least in part, on incident configuration data that specifies one or more alarms to utilize.

10. The computer-implemented method of claim 5, further comprising:
displaying, within the UI, a timeline UI element that includes a graphical representation of a timeline of activities that are associated with resolving the service interruption; and
at least partly in response to receiving a selection of a time, displaying within the UI a portion of first metric data associated with the time, and a portion of second metric data associated with the time.

11. The computer-implemented method of claim 5, further comprising displaying, within the UI, a plurality of runbook UI elements that include selectable UI elements that are associated with individual ones of the actions, and wherein selection of an individual one of the selectable UI elements causes information about an associated individual action of the individual ones of the actions to be displayed within an action UI element within the UI.

12. The computer-implemented method of claim 5, further comprising displaying, within the UI, a chat UI element that presents messages that are exchanged between the one or more users during a time associated with resolving the service interruption.

13. The computer-implemented method of claim 5, further comprising identifying the one or more second previous service interruptions that occurred within the service pro-vider network that are determined to be similar to the service interruption and that are associated with one or more of the customers and other customers of the service provider network.

14. The computer-implemented method of claim 5, further comprising:
    receiving a selection of a UI element to reassign at least one of the actions; and
    reassigning the at least one of the actions to a different user of the one or more users based, at least in part, on the selection.

15. A system comprising:
    one or more processors; and
    a non-transitory computer-readable storage medium having instructions stored thereupon which, when executed by the one or more processors, cause the system to:
        detect a service interruption that impacts, a plurality of customers of a service provider network, access to functionality hosted by the service provider network on behalf of a customer of the service provider network;
        identify actions that are associated with resolving the service interruption based at least in part on one or more first previous actions performed within the service provider network to resolve one or more first previous service interruptions that are a same as the service interruption and one or more second previous actions performed within the service provider network to resolve one or more second previous service interruptions that are determined to be similar to the service interruption, but that are different than the service interruption, and that have yet to occur with respect to the plurality of customers, and wherein the actions include re-starting a device associated with the service provider network;
        notify one or more users assigned to resolve the service interruption, wherein the one or more users are associated with the customer; and
        provide, for presentation within a graphical user interface (GUI):
            one or more of the actions to perform that are associated with resolving the service interruption; and
            metric data associated with the service interruption.

16. The system of claim 15, wherein the instructions further cause the system to identify the one or more users based, at least in part, on incident configuration data obtained from the customer of the service provider network, wherein the incident configuration data specifies one or more groups of users assigned to resolve the service interruption.

17. The system of claim 15, wherein the instructions further cause the system to obtain the metric data from a monitoring service of the service provider network, the metric data including one or more of first metrics associated with network connectivity and second metrics associated with computing resources utilized by the service provider network to provide the functionality.

18. The system of claim 15, wherein the instructions further cause the system to restart an application that provides at least a portion of the functionality at least partly in response to detecting the service interruption.

19. The system of claim 15, wherein the instructions further cause the system to display, within the GUI, a timeline UI element that includes a graphical representation of a timeline of activities that are associated with resolving the service interruption and a plurality of runbook UI elements that include selectable UI elements that are associated with individual ones of the actions.

20. The system of claim 15, wherein the instructions further cause the system to identify at least a portion of the one or more first previous service interruptions associated with one or more other customers of the service provider network that occurred within the service provider network and are determined to be similar to the service interruption.

* * * * *